Figure 1:
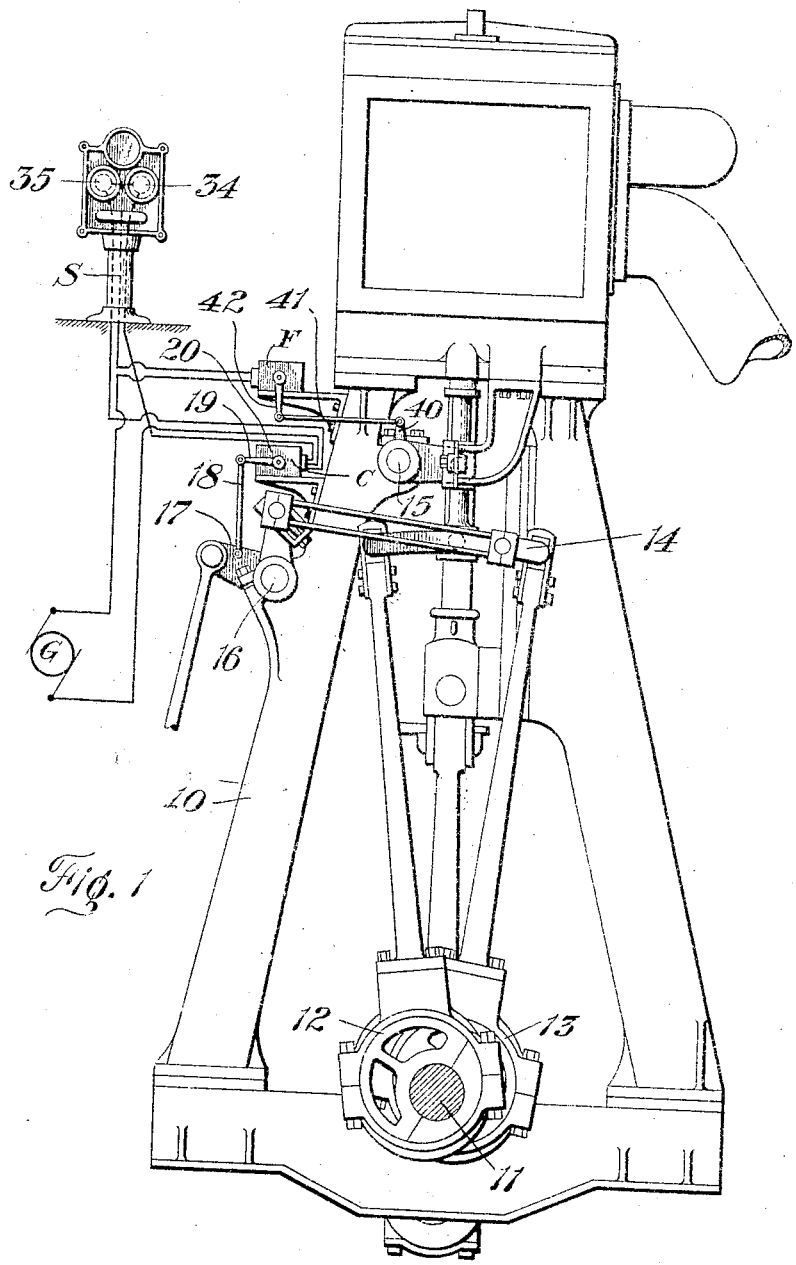

J. B. PURVIS.
INDICATOR.
APPLICATION FILED DEC. 31, 1910.

1,114,517.

Patented Oct. 20, 1914.
3 SHEETS—SHEET 1.

Witnesses
Chas. W. Stauffiger
F. E. Ernst

Inventor
John B. Purvis
By
Attorneys

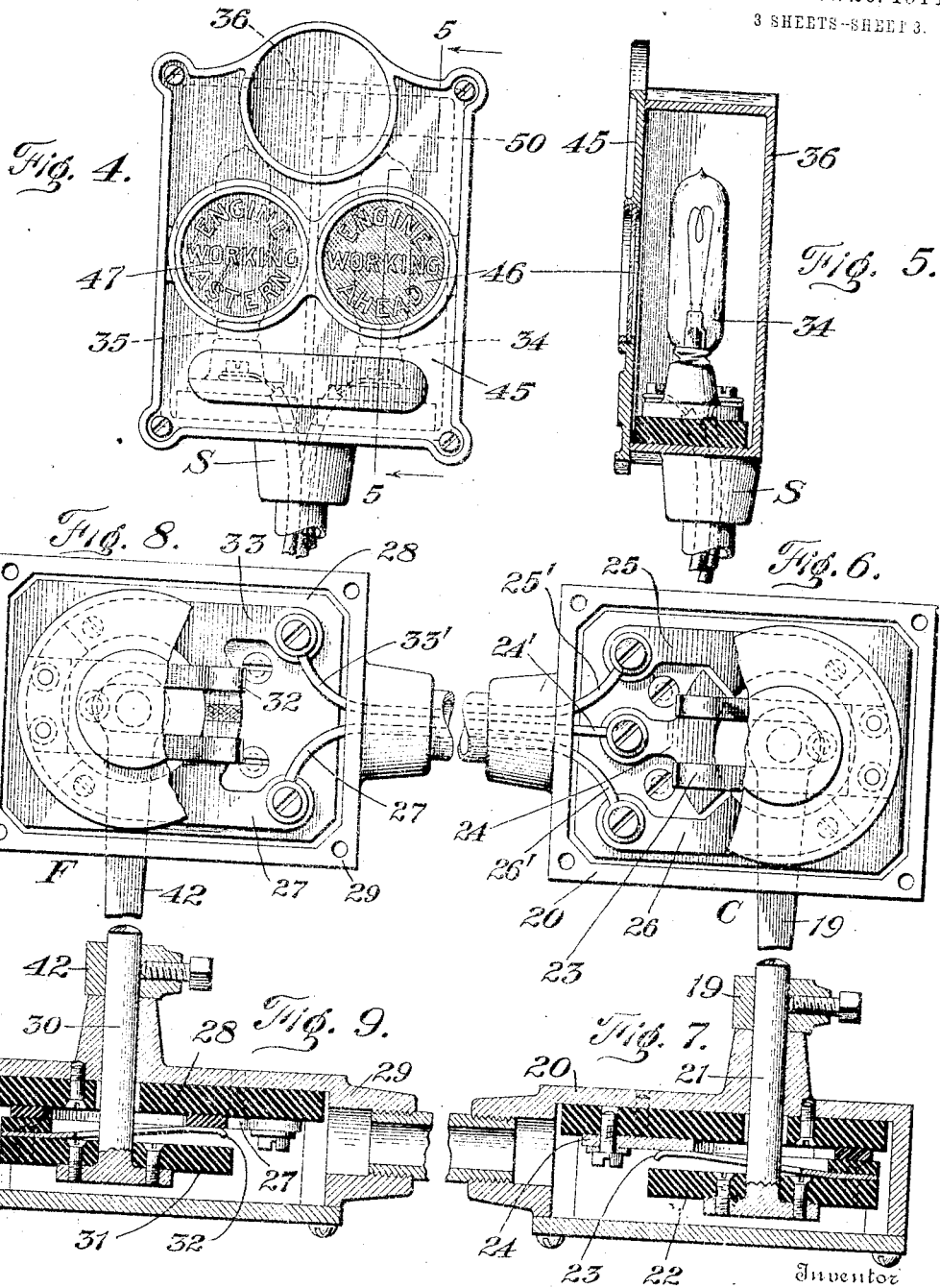

UNITED STATES PATENT OFFICE.

JOHN B. PURVIS, OF DETROIT, MICHIGAN.

INDICATOR.

1,114,517.  Specification of Letters Patent.  Patented Oct. 20, 1914.

Application filed December 31, 1910. Serial No. 600,230.

*To all whom it may concern:*

Be it known that I, JOHN B. PURVIS, a citizen of the United States of America, residing at Detroit, in the county of Wayne and State of Michigan, have invented certain new and useful Improvements in Indicators, of which the following is a specification, reference being had therein to the accompanying drawings.

This invention relates to indicators, and more particularly to that class thereof which are electrically operated and whereby the direction and also the speed of a moving member may be determined; and it has for one of its objects the provision of an apparatus in which the movement is indicated by one or more signals corresponding to the different directions thereof which may be either rotary, reciprocatory, oscillatory or polygonal, etc.

The invention has furthermore, for its object the provision of means whereby the signal will be operated at regular intervals during the uniform progress of the moving member so that therefore the speed of this member can readily be determined by the rapidity with which the signal-operations take place.

A further object of the invention resides in the combination with a pair of signals for indicating the direction of movement, of an electric circuit closer which is actuated by certain amounts of movement to actuate either signal in accordance with the rapidity of such movements in either direction.

Further objects of the invention will hereinafter appear and be defined in the claim.

While it is evident that the present invention is applicable to many different devices, I have shown in the accompanying drawings the signal system applied to a marine engine, the signaling apparatus being located at a point remote from the engine, as for instance the pilot-house or on the "bridge," while the signal-actuators are near the engine, so that consequently the activity of the engine, both in direction and speed, can be readily ascertained, and accidents due to carelessness or non-working of the order-signals can be avoided. In other words: the apparatus is so organized that when the engine is "working ahead," a signal (preferably a green light) will be displayed, this light however being intermittently flashed, or lighted and again extinguished, once during each rotation of the engine shaft. In a similar manner, a red light is displayed when the engine is "working astern," and is similarly "flashed" according to the speed of the engine shaft. In order to effect these results in an economical and satisfactory manner, each signal light has its own electric circuit; a "change" switch is operated by the reversing mechanism of the engine so that when the "link-motion" is set "forward," the green light circuit is closed by said switch, which when the link-motion is set "astern," the red light circuit is closed. A "flashing-switch" connected with both circuits is moved back and forth by being connected directly with an oscillatory member of the engine, as for instance, the rock-shaft for operating the valves, so that this back-and-forth motion of the flashing switch will continue as long as the engine is in motion, irrespective of either forward or backward direction.

Figure 2:
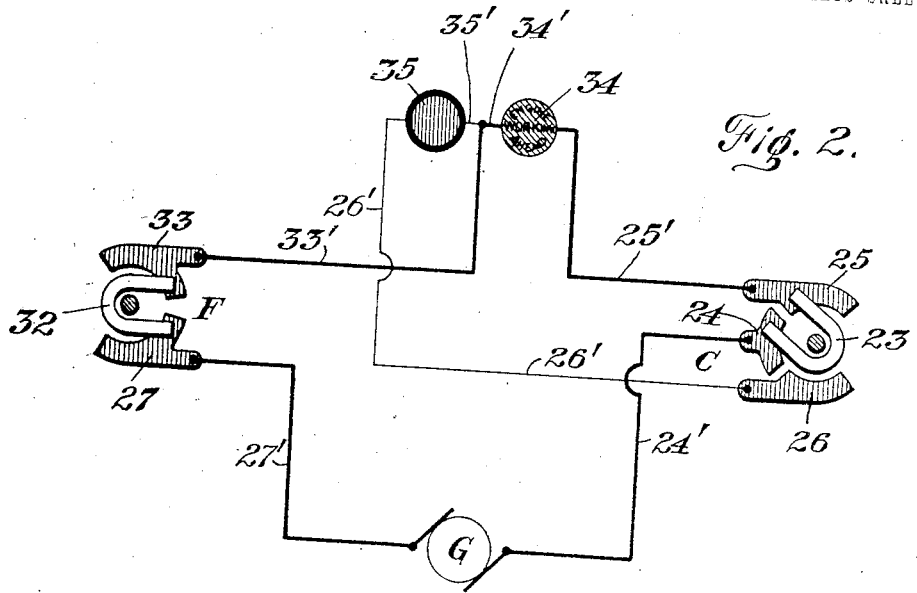
Figure 3:
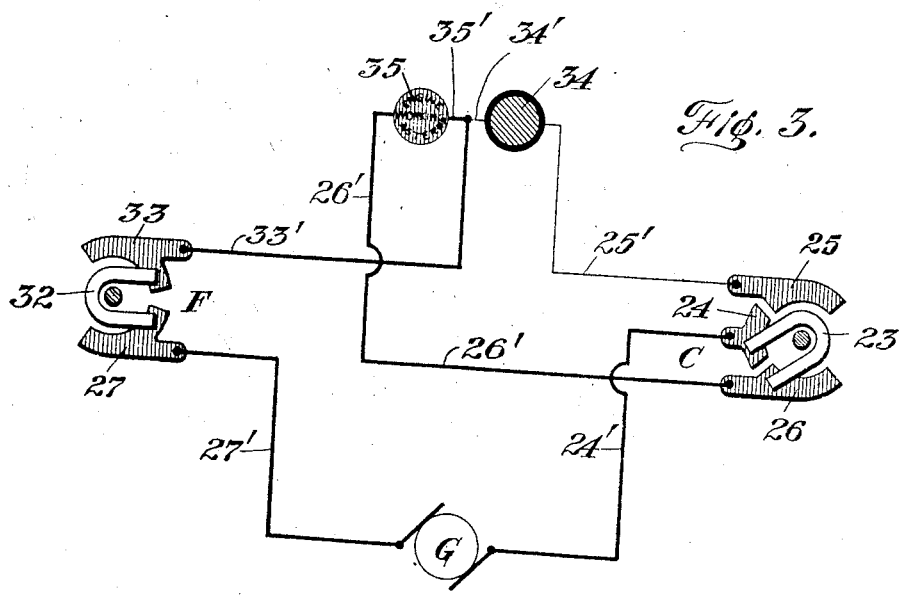

Referring now to the accompanying drawings in which similar characters denote similar parts, Figure 1 is a side view of a marine engine equipped with my improved indicator-apparatus; Fig. 2 is a diagram of the circuit which is active for the green signal; Fig. 3 is a similar diagram showing the circuit for the red light, the "change" switch being reversed; Fig. 4 represents a front view of an indicator comprising the green and red signals; Fig. 5 is a vertical section thereof on line 5—5 of Fig. 4; Figs. 6 and 7 are respectively front view and horizontal section of the "change-switch," and Figs. 8 and 9 are similar views of the "flash-switch."

In the drawings, the numeral 10 denotes the side-frame of a marine engine, the crank shaft 11 of which has opposed eccentrics 12, 13 connected with the reverse link 14 which operates the rock-shaft 15 for the valves, and which may be moved "forward" or "backward" by moving the rock-shaft 16 through its lever 17 in any desired manner. It should be remembered that in the drawing the link-motion is in its neutral position, and the engine is therefore idle. The lever 17 is connected, by a pitman rod 18, with an arm 19 of the "change switch" C which comprises a housing 20 (see Figs. 6 and 7) secured upon the frame 10, and the rock-spindle 21 journaled in the housing and carrying at its front end an insulated disk 22 to which a preferably-bifurcated contact-member 23 is firmly secured. The free ends of this member ride over the surfaces of three contact-plates 24, 25, 26, the central one (24) of which is connected by a conductor 24' with a generator G or other suitable source of energy, which sends a current through a conductor 27' to a contact plate 27 (see Figs. 8 and 9) of the "flashing-switch" F held on an insulated base-plate 28 secured to a housing 29.

Journaled in a bearing formed on the housing 29, is a spindle 30 which carries at its forward end an insulated disk 31 having secured thereto a contact-member 32 similar to the member 23 above described, and which is adapted electrically to connect and disconnect the plate 27 with and from a companion plate 33 also secured to said base-plate 28. A conductor 33' connects the plate 33 with both signals which are shown herein as lamps 34, 35, disposed in a two-compartment casing 36 and connected with main line 33' by branches 34', 35' respectively, (see Fig. 2). A conductor 25' connects the other pole of the lamp 34 with the contact-plate 25 of the change-switch C above mentioned, while a conductor 26' connects the other pole of the lamp 35 with the contact plate 26 of the change-switch.

In both Figs. 2 and 3, the position of the contact member is such to bridge the plates 27 and 33, while the bridge member of Fig. 2 electrically connects the "change switch," and therefore establishes the circuit for the green light 34; it being understood that the contact 23 has been swung into the position shown in Fig. 2 by setting the link motion of the engine to "forward." When now steam is admitted into the engine-cylinder by opening the throttle-valve, and the crank shaft begins to rotate, the rock shaft will also move, and the oscillatory movement is utilized in oscillating the contact member 32 of the flash-switch to make and break the connection between the conductor 27' and 33', such oscillation taking place once during each rotation of the crank-shaft, and being affected by an arm 40 secured to the valve rock-shaft 15, and connected by a link 41 with an arm 42 secured upon the spindle 30 of the flashing-switch.

It will be readily understood that the faster the engine "works ahead," the more frequently the green light will be flashed; also that similar conditions prevail in connection with the red light when the engine is "working astern."

The casing 36 of the signal stand S is in the present instance provided with a front cover 45 having a pair of lenses 46, 47 in order to enable the light to be seen. These lenses may be colored green and red, respectively, as indicated in Fig. 4, or the lamps themselves may be thus colored while the lenses can be white or transparent. Suitable lettering may also be used as shown, and a partition 50 makes each light-compartment an inclosed chamber by itself.

Many changes may be made in the construction and organization of the elements constituting my improved device without departing from the spirit of the invention, and I do not limit myself to the particular means described for accomplishing the desired results.

I claim:—

The combination with the reversing mechanism of an engine having a reversible link-motion and a valve actuating member, a signal embodying lamps, and a generator adapted to be placed in circuit with either of said lamps, of a change switch operated by the reversible link motion of the engine to establish a circuit through either lamp to indicate the position of said link-motion, a flash switch operated by said member and adapted to make and break the circuit of either lamp independent of the other, said switches comprising contacts for each circuit, oscillatory contact members adapted to engage said contacts with one of said members normally stationary upon two contacts while the other member shifts relatively to three contacts to complete circuits through said lamps.

In testimony whereof I affix my signature in presence of two witnesses.

JOHN B. PURVIS.

Witnesses:
 LEWIS E. FLANDERS,
 ANNA C. RAVILER.